United States Patent
Nellros et al.

(10) Patent No.: US 11,410,554 B2
(45) Date of Patent: Aug. 9, 2022

(54) METHOD AND CONTROL ARRANGEMENT FOR IDENTIFICATION OF PARKING AREAS

(71) Applicant: Scania CV AB, Södertälje (SE)

(72) Inventors: Frida Nellros, Tullinge (SE); Bashar Mengana, Stockholm (SE); Sarah Hantosi Albertsson, Kolmården (SE); Gustav Rånby, Sundbyberg (SE); Georg Von Zedtwitz-Liebenstein, Stockholm (SE); Jakob Rogstadius, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/976,517

(22) PCT Filed: Mar. 4, 2019

(86) PCT No.: PCT/SE2019/050183
§ 371 (c)(1),
(2) Date: Aug. 28, 2020

(87) PCT Pub. No.: WO2019/172823
PCT Pub. Date: Sep. 12, 2019

(65) Prior Publication Data
US 2020/0410861 A1    Dec. 31, 2020

(30) Foreign Application Priority Data
Mar. 6, 2018 (SE) .................... 1850238-5

(51) Int. Cl.
*G08G 1/14* (2006.01)
*G08G 1/01* (2006.01)
*G08G 1/065* (2006.01)

(52) U.S. Cl.
CPC .......... *G08G 1/147* (2013.01); *G08G 1/0129* (2013.01); *G08G 1/065* (2013.01)

(58) Field of Classification Search
CPC ....... G08G 1/147; G08G 1/0129; G08G 1/065
See application file for complete search history.

(56) References Cited

U.S. PATENT DOCUMENTS

| 8,781,735 B2 | 7/2014 | Udeshi et al. |
| 9,747,791 B2 | 8/2017 | Mayer et al. |

(Continued)

FOREIGN PATENT DOCUMENTS

| CN | 101968789 A | 2/2011 |
| CN | 103594000 A | 2/2014 |

(Continued)

OTHER PUBLICATIONS

Scania CV AB, International Application No. PCT/SE2019/050183, International Search Report, dated Apr. 26, 2019.

(Continued)

*Primary Examiner* — Mohamed Barakat
(74) *Attorney, Agent, or Firm* — Moore & Van Allen PLLC; W. Kevin Ransom

(57) ABSTRACT

The present disclosure relates to techniques in the context of vehicles, and in particular to methods for identifying parking areas for vehicles. According to one aspect, the disclosure relates to a method for identifying parking areas. The method comprises determining stops of a plurality of vehicles, wherein one stop is a geographical position where one vehicle of the plurality of vehicles has stayed longer than a pre-determined time period. The method further comprises clustering the determined stops into clusters based on spatial closeness of the geographical positions of the determined stops and determining parking areas by identifying one or more of the clusters that fulfil one or more pre-determined criteria. The disclosure is also related to a control arrangement and to a computer program for performing the proposed method.

11 Claims, 6 Drawing Sheets

(56) References Cited

U.S. PATENT DOCUMENTS

| | | | |
|---|---|---|---|
| 10,546,497 B2* | 1/2020 | Subramanya | G06Q 10/02 |
| 2013/0158853 A1 | 6/2013 | Li et al. | |
| 2013/0211699 A1 | 8/2013 | Scharmann et al. | |
| 2015/0177002 A1 | 6/2015 | Sourani et al. | |
| 2016/0025503 A1 | 1/2016 | Kees et al. | |
| 2016/0125736 A1* | 5/2016 | Shaik | G08G 1/14 701/23 |
| 2016/0189186 A1 | 6/2016 | Fabrikant et al. | |
| 2016/0223345 A1 | 8/2016 | Thakur et al. | |
| 2016/0225255 A1* | 8/2016 | Thakur | G01C 21/32 |
| 2016/0364985 A1* | 12/2016 | Penna | G08G 1/0967 |
| 2017/0270794 A1* | 9/2017 | Sweeney | G08G 1/143 |
| 2019/0063947 A1* | 2/2019 | Beaurepaire | G01C 21/3476 |
| 2019/0147368 A1* | 5/2019 | Pinel | G06N 5/022 706/12 |
| 2019/0355245 A1* | 11/2019 | Gigengack | G08G 1/0129 |

FOREIGN PATENT DOCUMENTS

| | | | |
|---|---|---|---|
| CN | 103903438 A | 7/2014 | |
| CN | 104160247 A | 11/2014 | |
| CN | 104508507 A | 4/2015 | |
| CN | 105321372 A | 2/2016 | |
| CN | 106462627 A | 2/2017 | |
| DE | 102015207804 A1 | 11/2016 | |
| JP | 2009289174 A | 12/2009 | |
| JP | 2013210706 A | 10/2013 | |
| JP | 2014021840 A | 2/2014 | |
| WO | 2010081547 A1 | 7/2010 | |
| WO | 2012019628 A1 | 2/2012 | |

OTHER PUBLICATIONS

Scania CV AB, International Application No. PCT/SE2019/050183, Written Opinion, dated Apr. 26, 2019.

Scania CV AB, Swedish Application No. 1850238-5, Office Action, dated Oct. 3, 2018.

bestparking.com, "Best Parking—Find Parking," accessed Oct. 16, 2017, https://play.google.com/store/apps/details?id=com.bestparking&hl=en.

Gong, L., et al., Identification of activity stop locations in GPS trajectories by density-based clustering method combined with support vector machines, Journal of Modern Transportation, 2015, pp. 202-213, vol. 23, issue 3.

Scania CV AB, European Application No. 19764999.9, Extended European Search Report, dated Nov. 4, 2021.

Scania CV AB, Chinese Patent Application No. 201980015953.6, First Office Action, dated Dec. 29, 2021.

Scania CV AB, International Application No. PCT/SE2019/050183, International Preliminary Report on Patentability, dated Sep. 8, 2020.

* cited by examiner

METHOD AND CONTROL ARRANGEMENT FOR IDENTIFICATION OF PARKING AREAS

CROSS-REFERENCE TO RELATED APPLICATIONS

This application is a national stage application (filed under 35 § U.S.C. 371) of PCT/SE2019/050183, filed Mar. 4, 2019 of the same title, which, in turn, claims priority to Swedish Application No 1850238-5 filed Mar. 6, 2018; the contents of each of which are hereby incorporated by reference.

FIELD OF THE INVENTION

The present disclosure relates to techniques in the context of vehicles, and in particular to a method for identifying parking areas for vehicles. The disclosure is also related to a control arrangement and to a computer program for performing the proposed method.

BACKGROUND OF THE INVENTION

Drivers of heavy vehicles, such as trucks, often experience difficulties to find parking areas along the road where they can stay to rest according to restrictions for driving time. In addition, it can be troublesome for a driver to know, before arriving on a parking area, if the parking is big enough for trucks. Furthermore, if suitable parking areas are not found by drivers that stay in their vehicles overnight, the drivers might face problems with damage (e.g. getting truck covers cut) or theft of cargo and fuel. This might in turn generate stress and insecurity amongst drivers.

Databases with safe truck parking areas exist in a handful of countries, e.g. with data sources such as the Swedish Transport Administration ("Trafikverket"). These databases are based on information about known parking areas. However, many drivers mainly rely on hearsay when looking for suitable parking areas, which generally is quite unreliable.

Another solution for finding resting spots is suggested by JP2014021840, which proposes to collect information related to resting spots in wide range, the information obtained from actual rests performed by crews of individual vehicles, store the information in a database and enable individual vehicles to share the information. However, this solution requires that vehicles actively shares "rest event" information including a vehicle category and current position of the vehicle.

SUMMARY OF THE INVENTION

It is an object of the disclosure to alleviate at least some of the drawbacks with the prior art. Thus, it is an object to make it possible for drivers to easily find suitable parking areas (e.g. where it's possible to stay overnight) and also to make it possible for them to share information about parking areas. Furthermore, it is an object to provide a way of determining parking areas that can be implemented globally and which may consider additional info, apart from location.

These object and others are at least partly achieved by the method and the device according to the independent claims, and by the embodiments according to the dependent claims.

According to a first aspect, the disclosure relates to a method for identifying parking areas. The method comprises determining stops of a plurality of vehicles, wherein one stop is a geographical position where one vehicle of the plurality of vehicles has stayed longer than a pre-determined time period. The method further comprises clustering the determined stops into clusters based on spatial closeness of the geographical positions of the determined stops and determining parking areas by identifying one or more of the clusters that fulfil one or more pre-determined criteria.

In contrast to the databases used today, the proposed method makes it possible for drivers to also explore unofficial parking and resting spots. Furthermore, the proposed method may determine the parking areas based on real-time data from connected vehicles. Hence, in some embodiments the information provided by the method will always be up to date, which may not be the case when looking for parking areas in databases.

The method is also easy to implement, as the only requirement is that there are connected vehicles or other position sources, such as phones, in the vehicles. This will make it easier for drivers comply with driving and resting time. The identified parking areas may be used as decision support both beforehand when planning routes and also on the roads.

According to some embodiments, the method comprises obtaining position data of a plurality of vehicles and then the determining comprises determining stops based on the position data. In contrast to prior art, the method is not dependent on that the vehicles reports stops (e.g. "stop started"-"stop ended" events). Instead, the method may calculate the stops based on any position data, independent on position source. For example, data may be collect from mobile phones (in the vehicles) instead of from the vehicles themselves, which makes the method independent of the vehicle manufacturer.

According to some embodiments, the position data comprises one stream of time stamped positions for each of the plurality of vehicles and then the determining comprises identifying sequences of the time stamped positions that have a spatial separation that is below a tolerance level. Thereby, stops may be calculated in a robust way.

According to some embodiments, each stop is also associated with a time defining when a vehicle stayed or stopped at the stop, and then the clustering is also based on time closeness of the times. Thus, additional info can be extracted from connected vehicles in addition to only location. By also using the time, more relevant information is provided.

According to some embodiments, the determining comprises determining more than a pre-determined number of stops. If the number of stops used in the clustering is above a pre-determined number or level, the information will be more reliable.

According to some embodiments, the method further comprises determining, based on the position data and/or user input, availability information associate with the determined stops, e.g. whether one of the determined parking areas is full or not. Thus, by combining the data from the clustering with input from e.g. drivers, the relevance of the information might be even higher.

According to some embodiments, the method further comprises providing information identifying the determined parking areas to a user via a user interface. By providing information about parking spots to a driver, the driver may be less stressed and willing to contribute with additional data (i.e. WC nearby, clean parking spots, safety and so on) that may further increase quality.

According to some embodiments, the method further comprises the pre-determined criteria comprises that the number of stops of the cluster is above a threshold value. Hence, only parking areas that are used by a significant number of vehicles may be considered. Thus, irrelevant parking areas may be filtered out and never presented to users.

According to some embodiments, the method further comprises the pre-determined criteria comprises that that the vehicles that have stayed at the cluster belong to more than a pre-determined number of vehicle owners. This criterion avoids that e.g. private garages or similar are reported.

According to some embodiments, the method further comprises the pre-determined criteria comprises that that the number of different individual vehicles that have stayed at the cluster is above a threshold value. Parking areas that are only used by one or a few individual vehicles are probably not suitable parking areas, but more likely someone's "private home" and should not be considered suitable parking areas.

According to some embodiments, the method further comprises the pre-determined criteria comprises that that the frequency of points in time, at which one of the plurality of vehicles has stayed at one of the stops, is within a pre-determined frequency interval. Thereby, the quality of the determination of parking areas will be higher. In other words, the likelihood that they are good parking areas will be higher.

According to some embodiments, the method further comprises the pre-determined criteria comprises other criteria defined by user input. Thereby, the proposed method may be improved by adding information about the so-called ground truth.

According to a second aspect, the disclosure relates to control arrangement configured to identify parking areas. The control arrangement is configured to determine stops of a plurality of vehicles, wherein one stop is a geographical position where one vehicle of the plurality of vehicles has stayed longer than a pre-determined time period. The control arrangement is further configured to cluster the determined stops into clusters, based on geospatial closeness of the geographical positions of the stops, and to determine parking areas by identifying one or more of the clusters that fulfil one or more pre-determined criteria.

According to some embodiments, the control arrangement is configured to obtain position data of a plurality of vehicles and to determine the stops based on the position data.

According to some embodiments, the position data comprises one stream of time stamped positions for each of the plurality of vehicles and the control arrangement is configured to determine the stops by identifying sequences of the time stamped positions that have a spatial separation that is below a tolerance level.

According to some embodiments, each stop is also associated with a time defining when a vehicle stayed at the stop, and wherein the clustering is also based on time closeness of the points in time of the stops.

According to some embodiments, the control arrangement is configured to determine more than a pre-determined number of stops.

According to some embodiments, the control arrangement is configured to provide information identifying the determined parking areas to a user via a user interface.

According to some embodiments, the control arrangement is configured to predict, based on the position data and or user input, whether one of the determined parking areas is full or not.

According to a third aspect, the disclosure relates to a computer program comprising instructions which, when the program is executed by a computer, cause the computer to carry out the method according to any one of the embodiments of the method described above and below.

According to a fourth aspect, the disclosure relates to a computer-readable medium comprising instructions which, when executed by a computer, cause the computer to carry out any one of the embodiments of the method described above and below.

BRIEF DESCRIPTION OF THE DRAWINGS

FIG. 4b illustrates stops and clusters determined from the position data of FIG. 4a.

DETAILED DESCRIPTION OF THE INVENTION

This disclosure proposes an algorithm for identifying parking areas for vehicles, e.g. suitable resting stops for truck drivers, based on position data from connected vehicles. In addition, the disclosure proposes a complete service functionality that explains how to create user value through the identification. In contrast to the prior art solution, some embodiments of the proposed solution involve connection to vehicles on-site. It also enables user input, e.g. by a rating functionality. In other words, it is herein proposed to identify "parking areas" by collecting information about areas where several connected vehicles have stopped more than once.

More specifically, it is proposed that potential parking areas are determined by grouping or clustering individual stops of a plurality of vehicles into clusters. A subset or fraction of the clusters are then identified as being parking areas (using some filtering heuristics) and exposed through an Application Programming Interface, API. On top of the API, complete service functionality, e.g. a user interface, could be added. The complete service functionality could range from basic simple parking area recommendations to parking area availability status and parking area rating functionality.

Figure 1:
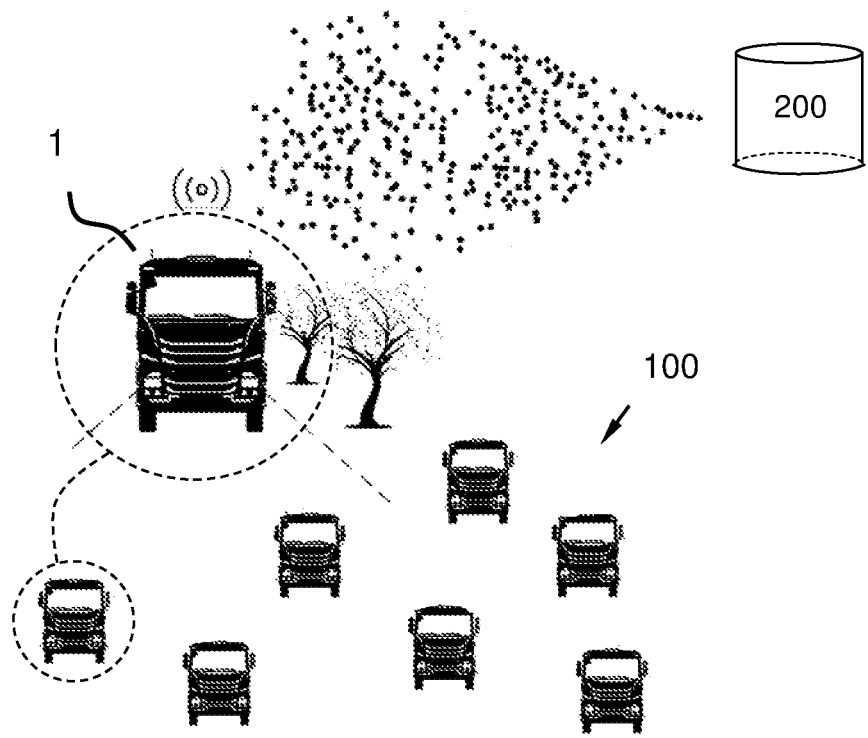
FIG. 1 illustrates a front view of one vehicle of a plurality of vehicles.

The proposed method comprises identifying parking areas using data provided by a plurality (or set) of vehicles 100. FIG. 1 illustrates a front view of one example vehicle 1 of a plurality of vehicles 100. The plurality of vehicles 100 may be e.g. all vehicles produced by a certain vehicle producer during a configurable time period, or a subset thereof; all vehicles owned by the same owner, or a subset thereof; all vehicles of a certain geographical region, or a subset thereof, etc.

The vehicle 1 may comprise a means for transportation in broad sense such as e.g. a truck, a car, a motorcycle, a trailer, a bus, a bike, a train, a tram, an aircraft, a watercraft, a cable transport, an aerial tramway, a drone, a spacecraft, or other similar manned or unmanned means of conveyance running e.g. on wheels, rails, air, water or similar media.

The vehicle 1 may be configured for running on a road, on a rail, in terrain, in water, in air, in space, etc. The vehicle 1 may be driver controlled or driverless (i.e. autonomously controlled) in different embodiments. However, for enhanced clarity, the vehicle 1 is subsequently described as having a driver.

The vehicle 1 may be connected to Fleet Management services or similar service provided by a third party. Such service may comprise e.g. tracking of the vehicle 1 and diagnostics of vehicle parameters such as mileage and fuel consumption, maintenance etc.

The expression "Fleet Management services" is to be regarded in a broad sense in this disclosure, as the kind of service per se is not part of the invention, and may comprise for example educational services for learning the driver to use less fuel and/or reduce CO2 emissions, for detecting anomalies or malfunctions of the vehicle 1 and/or inappropriate behavior of the driver such as speeding, and/or providing recommendations concerning maintenance and service measures etc.

Figure 2:
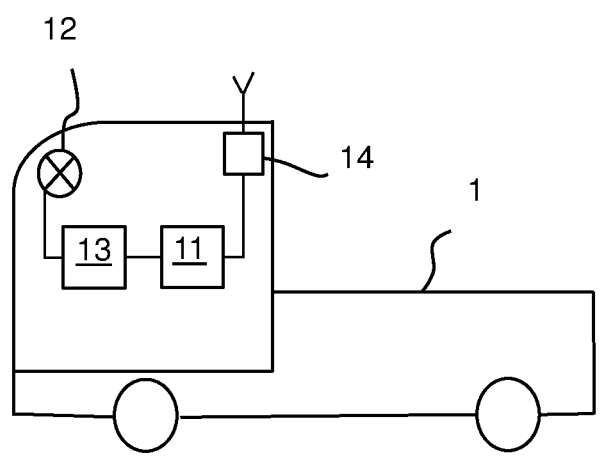
FIG. 2 shows the vehicle of FIG. 1 in more detail.

FIG. 2 shows parts of the vehicle 1 associated with the proposed technique in more detail. More specifically, the vehicle 1 comprises one or more control units 11, a positioning device 12, a navigation unit 13 and a wireless communication interface 14.

The positioning device 12 is configured to determine a geographical position of the vehicle 1 based on e.g. a satellite navigation system such as the Navigation Signal Timing and Ranging (Navistar) Global Positioning System (GPS), Differential GPS (DGPS), Galileo, GLONASS, or the like.

Thus, the geographical position of the positioning device 12, (and thereby also of the vehicle 1), as well as time, vehicle speed, heading, etc., may be determined continuously, or at a certain pre-determined or configurable time interval according to various embodiments.

Figure 3:
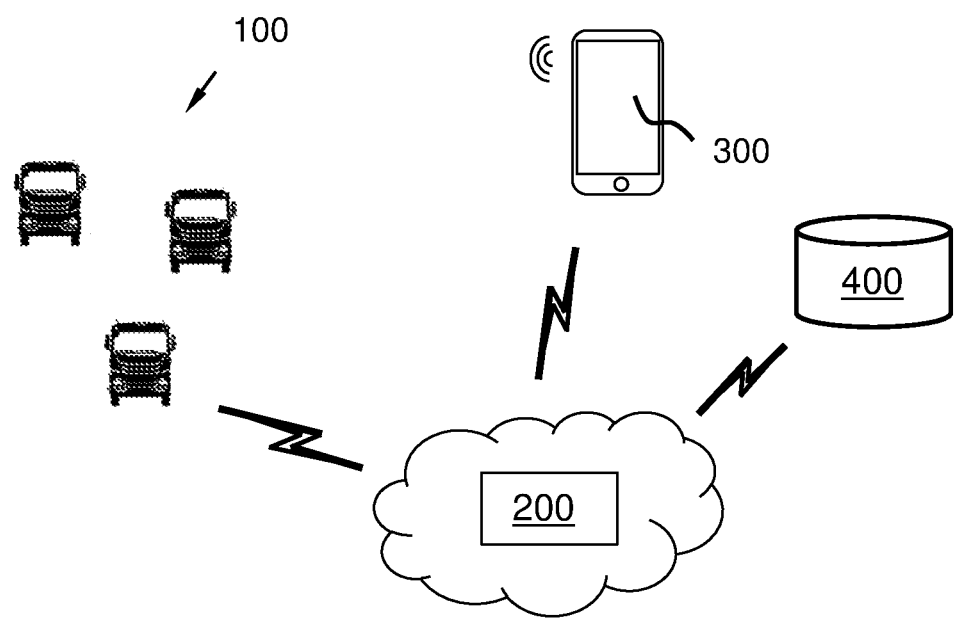
FIG. 3 illustrates a system where the proposed method may be implemented.

The wireless communication interface 14 is configured to enable wireless communication with a server or backend, e.g. an external control arrangement 200 (FIG. 3).

The communication may be performed over a wireless interface comprising, or at least being inspired by cellular radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMAX), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), or similar, just to mention some few options, via a wireless communication network.

The wireless communication may also or alternatively be performed according to any IEEE standard for wireless vehicular communication like e.g. a special mode of operation of IEEE 802.11 for vehicular networks called Wireless Access in Vehicular Environments (WAVE). IEEE 802.11p is an extension to 802.11 Wireless LAN medium access layer (MAC) and physical layer (PHY) specification.

The control unit 11 is an embedded device that controls one or more electrical systems (or sub systems) in the vehicle 1. The control unit 11 comprises hardware and software. The hardware basically comprises various electronic components on a Printed Circuit Board, PCB. The most important of those components is typically a processing unit e.g. a microprocessor, along with a memory e.g. EPROM or a Flash memory chip. The software (also called firmware) is typically lower-level software code that runs in the microcontroller.

Typically, the vehicle 1 comprises multiple control units that are communicating over a Controller Area Network, CAN. The CAN network is used to handle the communication between various control units in the vehicle 1. Often, several CAN networks that are connected through a central control unit are arranged in the vehicle 1. Some modern motor vehicles have up to 80 control units. However, for simplicity only one control unit 11 is illustrated in FIG. 2. Though, it must be understood that the proposed techniques may be implemented in any control unit 11 in the vehicle 1.

The control unit 11, the positioning device 12 and the wireless communication interface 13 in the vehicle 1 may interactively communicate via e.g. a wired or wireless communication bus. The communication bus may comprise the above-mentioned CAN bus, a Media Oriented Systems Transport (MOST) bus, or similar. However, the communication may alternatively be made over a wireless connection comprising, or at least be inspired by any of the previously discussed wireless communication technologies.

The control unit 11 is further configured to control the functionality of the positioning device 12. More specifically, the control unit is configured to control the positioning device 12 to generate positioning data comprising time stamped positions 10 of the vehicle 1 and to control the wireless communication interface 13 to transmit the positioning data to a device external to the vehicle 1, e.g. a control arrangement 200 (FIG. 3).

FIG. 3 is a conceptual image of a system where the proposed technique may be implemented. The system comprises the plurality of vehicles 100, a control arrangement 200 and a device comprising a user interface 300. The plurality of vehicles 100 are connected to the control arrangement 200. The connection is e.g. established over the internet using cellular radio access technologies. The plurality of vehicles 100 transmits data to the control arrangement 200. For example, the vehicles 100 continuously generate position data and transmits the positioning data to the control arrangement 200, as described in connection with FIG. 2. The control arrangement 200 receives data (e.g. position data) from the plurality of vehicles 100 and identifies parking areas based on the data using the method that will be described in relation to the flow chart of FIG. 5. The parking areas may then be presented to a user via a user interface 300. The control arrangement 200 may also comprise, or be connected to a database 400, which database 400 may comprise vehicle related data and/or geographical map data.

The principle of the proposed method for identifying parking areas performed by the control arrangement will now first be briefly described with reference to FIG. 4a to FIG. 4d, representing a geographical map of a territory.

Figure 4A:
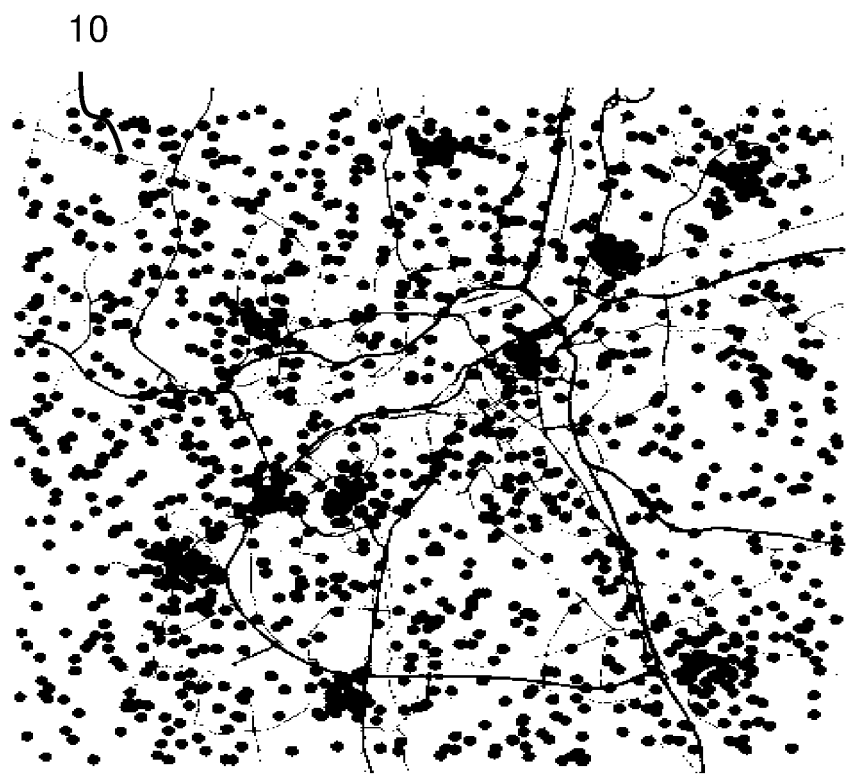
FIG. 4a illustrates time stamped positions of a plurality of vehicles.

FIG. 4a illustrates time stamped instantaneous positions 10 of the plurality of vehicles 100, recorded at different points in time. The time stamped positions 10 are e.g. recorded by positioning devices 12 in the plurality of vehicles 100. Alternatively, the time stamped positions 10 are recorded by other devices in the vehicles such as GPS devices or mobile phones. The position of each individual vehicle is typically recorded periodically e.g. every second.

Hence, together the time stamped positions 10 illustrates how the plurality of vehicles 100 move over time.

Figure 4B:
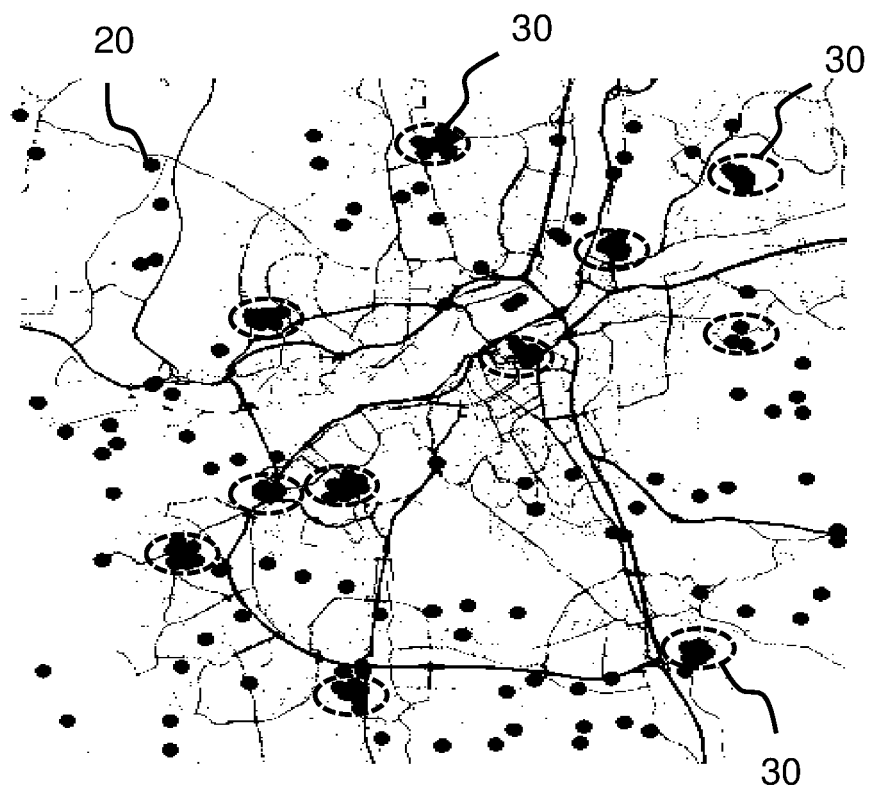

FIG. 4b illustrates stops that are determined from the position data of FIG. 4a. The stops 20 are those of the positions 10 (FIG. 4a) where any vehicle of the plurality of vehicles 100 have stopped, i.e. stayed for a pre-determined time. In other words, in contrast to the positions of FIG. 4a, which are only instantaneous positions of individual vehicles, the stops of FIG. 4b indicates positions where one of the plurality of vehicles has stayed for a significant time. Hence, one stop is typically defined by time, a geographical position (e.g. coordinates) and a vehicle identity. Stops may be determined in different ways as will be further described in relation to and FIG. 6. Generally, only stops where a vehicle has stopped for some time is relevant. The amount of time that a vehicle spent at the stops may also be recorded.

FIG. 4b also illustrates some examples of clusters 30 of stops 20 (marked by dashed ellipses). The clusters 30 are here formed by clustering or grouping the stops 20 based on the geographic positions of the stops 20. Here the stops 20 are grouped based on spatial (or geographical) closeness. In other words, one cluster 30 will represent vehicles stops 20 that are located close to each other. Thus, one cluster 30 may include a plurality of stops 20. When performing clustering of the stops 20, a plurality of clusters are formed. Some clusters 30 may each only comprise one single stop 20. Other clusters may each comprise several stops 20 that are in close proximity to each other. When performing clustering some or all stops 20 may be included in clusters. For simplicity, only a few clusters are marked in FIG. 4b, even though the clustering might generate more clusters 30.

Figure 4C:
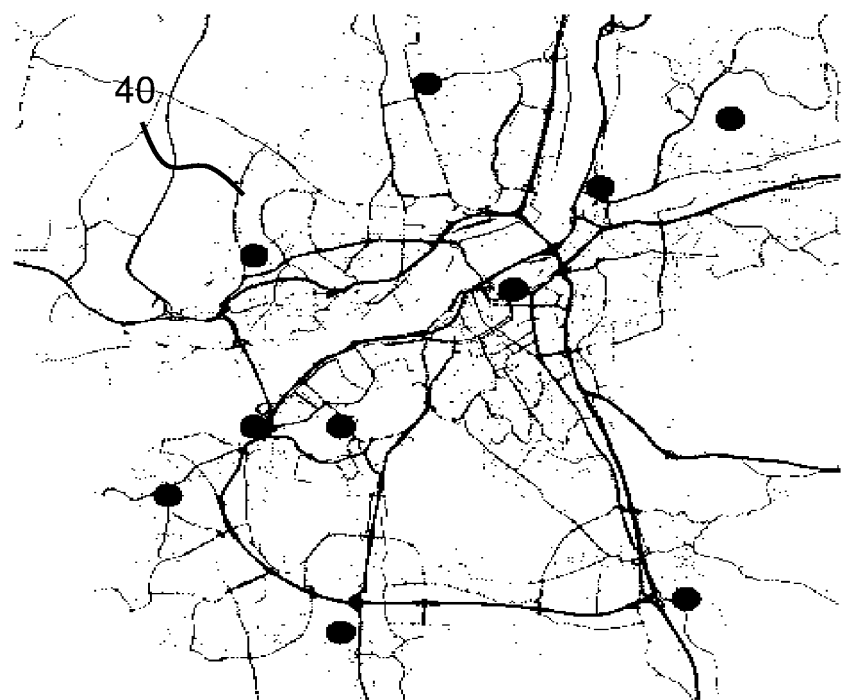
FIG. 4c illustrates parking areas are determined by filtering the clusters of FIG. 4b.

FIG. 4c illustrates parking areas 40 determined from the clusters 30. Parking areas 40 are clusters 30 that fulfil certain pre-defined criteria. A parking area 40 may be determined as a centre or average position of the vehicles in a cluster 30 that fulfil the certain criteria. The criteria may e.g. involve the number of vehicles in the cluster or other parameters as will be further explained below in connection with FIG. 5.

Figure 5:
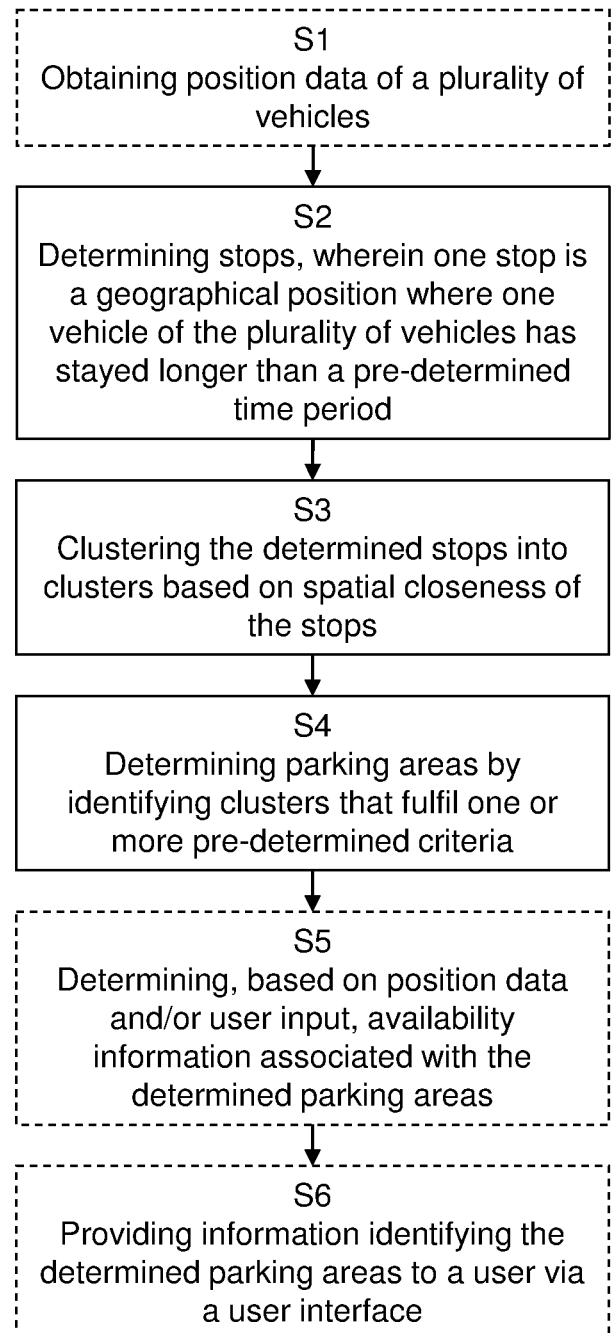
FIG. 5 is a flow chart illustrating an embodiment of a method according to an example embodiment.

FIG. 5 is a flow chart illustrating an embodiment of a method for identifying parking areas according to an example embodiment. The method is typically performed by a control arrangement 200 (FIG. 7), such as a server (or backend) owned e.g. by the vehicle manufacturer, that is arranged to communicate wirelessly with the plurality of vehicles 100. More specifically, the method is typically performed by a processor 210 (FIG. 7) of the control arrangement. The method may be performed continuously once sufficient data is retrieved from the plurality of vehicles 100. In other words, the method may be performed again as soon as new data is available, so that new stops may be discovered and old stops will be continuously evaluated and new parking areas will be found. Thus, the method creates a "living" model where parking areas are determined and disappear due to the fact that positions from the plurality of vehicles 100 are evaluated. A determined parking area can e.g. be removed if now new stops have been added to the corresponding cluster has for a certain period of time.

The method may be implemented as a computer program comprising instructions which, when the program is executed by a computer (or more specifically a processor in the computer), cause the computer to carry out the method. According to some embodiments the computer program is stored in a computer-readable medium (e.g. a memory or a compact disc) that comprises instructions which, when executed by a computer, cause the computer to carry out the method.

The method comprises determining S2 stops 20 of a plurality of vehicles. One stop is e.g. defined as a geographical position where at least one vehicle of the plurality of vehicles 100 has stayed longer than a pre-determined period. A stop is typically defined by a geographical position, a time when a vehicle stopped at the stop and an identity of the vehicle that stopped at the stop. The stop may also be defined by or associated with further parameters as duration of the stop or other vehicle data. Further techniques to identify the purpose of a stop 20 may be developed. It may e.g. be known that a vehicle 1 stops to deliver goods, then such a stop may not be used to identify parking spaces.

The stops are determined based on data received from the plurality of vehicles 100. The data provided by each individual vehicle of the plurality of vehicles is e.g. position data i.e. data indication positions of the vehicle, such as time stamped positions from e.g. a GPS. The data may alternatively be data that explicitly indicates or defines stops of the vehicle.

In other words, in some embodiments the method further comprises obtaining S1 position data of a plurality of vehicles 100 and determining S2 the stops 20 based on the position data. The obtaining e.g. comprises receiving position data from navigation units of the plurality of vehicles 100 or from other positioning devices in the vehicles such as from GPSs and mobile phones. The position data e.g. comprises a sequence of time stamped positions of the vehicle.

There are many ways to identify stops from a sequence of positions (e.g. centroid-based, speed-based, duration-based, density-based). See for example "Identification of activity stop locations in GPS trajectories by density-based clustering method combined with support vector machines", Journal of Modern Transportation, September 2015, Volume 23, Issue 3, pp 202-213, retrieved from https://rd.springer.com/article/10.1007/s40534-015-0079-x.

Figure 6:
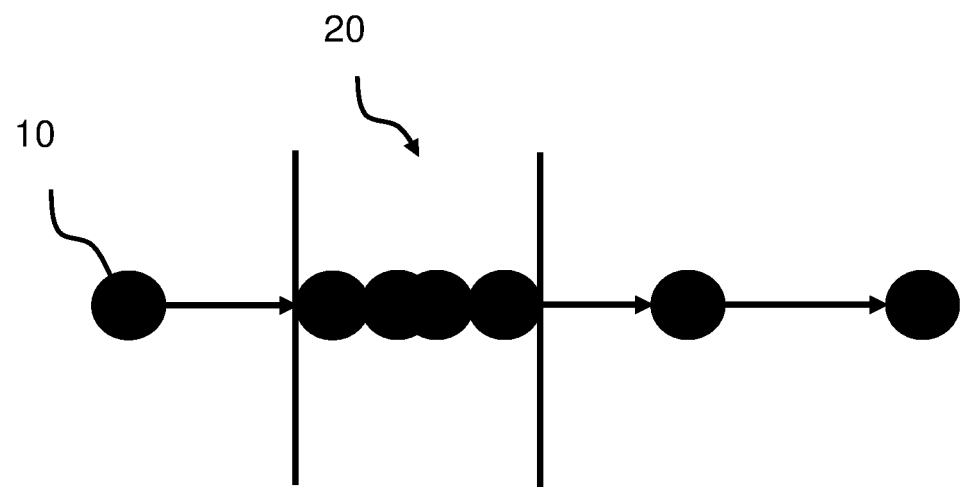
FIG. 6 illustrates one example of determining stops.

FIG. 6 illustrates one example algorithm for determination of stops 20 that may be used for the determining S2 of stops 20. This algorithm is based on geospatial density in time, which is a complicated way of saying that the speed is low. It basically means that one sequence of consecutive positions of a vehicle, where the distance between each position and its subsequent position is less than one threshold and where the time between the first position in the sequence and the last position in the sequence is greater than another threshold, is considered a stop. In other words, in one example embodiment the position data comprises one stream of time stamped positions 10 for each of the plurality of vehicles 100 and then the determining S2 comprises identifying sequences of the time stamped positions 10 that have a geospatial separation that is below a tolerance level. The tolerance level then corresponds e.g. to an accuracy of a GPS. The reason is that because the GPS is not perfect, the positions determined by the GPS will not be exactly the same, even if the vehicle is completely still. Hence, the purpose of this algorithm is e.g. to identify sequences of GPS positions that only differ within an expected margin of error of the GPS.

One advantage associated with calculating the stops based on position data is that the method is then more generic. In principle, it is then enough to have mobile phones in the vehicles that keeps track of the vehicles' positions. Another advantage is that it is possible to control the algorithm for determination of stops and select thresholds that provide an appropriate filtering of stops. For example, one might want to ignore stops where a vehicle stayed for a very short time.

In an alternative embodiment the stops may be determined in the vehicles (or in other devices in the vehicles e.g. mobile phone) and reported to the control arrangement 200. For example, some vehicles may have built-in logic for detecting stops and send information about detected stops. Thus, according to some embodiments the determining comprises receiving data defining the stops from the plurality of vehicles 100. For example, the data may define the start time, stop time and/or duration of the stops 20.

The amount of data, or more specifically the number of stops, may be crucial to get reliable information. Therefore, in some embodiments the determining S2 comprises determining more than a pre-determined number of stops 20. The pre-determined number is e.g. empirically determined. However, a typical vehicle manufacturer that has more than 300000 connected vehicles reporting position data at least every 10th minute (often more often) would generate (~300000 vehicles*365 days*24 hours*6 times/hour per year) 16 billion positions per year. This would typically be enough to provide reliable information at least if data is collected continuously over a few years.

The method further comprises clustering S3 the determined stops 20 into clusters 30 based on spatial closeness of the determined stops 20. The clustering means that the stops 20 are grouped in such a way that objects in the same group (called a cluster) are more similar (in some sense, here geographical position) to each other than to those in other groups (clusters). The clustering S3 may e.g. be implemented using a density-based clustering algorithm, a connectivity-based clustering algorithm and/or a centroid based clustering algorithm.

One can also describe this as a "self-join" of stops, with regard to closeness in geographical space. The term "self-join" comes from database theory and describes how to join sets. What is meant mathematically is that a cartesian product of the sets is calculated, i.e. all combinations where one element comes from one set and the other element from the other set are calculated and then a "join-condition" indicates which combinations to be retained. A common "join condition" is that a field in one element is equal to one field in the other element. For example, if there are a lot of vehicles with one data field indicating an identity for the owner (owner id) and a number of vehicle owners with an identity (id), then vehicles can be joined with their owners, by using the "owner id=id" as join condition. In this case, a connection is made between the stops using the position of the stop as a "join condition", wherein the "join condition" is that the distance between the stops should be below a threshold.

The clustering may additionally consider other parameters, such as when a vehicle stopped at a stop. Thus, in some embodiments each stop 20 is also associated with a time defining when a vehicle stayed or stopped at the stop 20, and then the clustering S3 is also based on time closeness of the times of the stops 20. A time is e.g. a point in time when a vehicle stopped (i.e. arrived) at the stop or a time period when the vehicle stood still at the stop. Closeness of time periods may be determined e.g. by comparing the end points and/or the middle of the time periods. In other words, the clusters will then comprise stops that are close both in time and in geographical distance. For example, it may e.g. be beneficial to only accept stops that are fairly close to time (in this case, 60-90 days). The method is likely to work without filtering on time—but the result will likely improve with a filtering of edges in terms of time.

The clusters of stops are basically groups of stops that are located in the vicinity of each other. The areas corresponding to the clusters may be regarded as areas where it is likely good to park. However, the clustering may typically also reveal some areas that are not suitable parking areas, but where one or more vehicles frequently stop. Examples of such areas may be vehicle workshops, drivers' homes or private garages. Hence, to provide good information about parking areas some filtering is typically needed. In other words, the method further comprises determining S4 parking areas 40 by identifying clusters that fulfil one or more pre-determined criteria. A simple heuristic model may be used to decide if a cluster is a suitable parking area. In the long run one might also use machine learning to train a model to select suitable parking areas.

The filtering may for e.g. filter out clusters that only comprises a few stops or clusters where only one particular vehicle has stopped or where vehicles from one single owner has stopped. In other words, according to some embodiments the pre-determined criteria comprise that the vehicles 1 that have stayed at the cluster belong to more than a pre-determined number of vehicle owners. According to some embodiments the pre-determined criteria comprises that the number of different individual vehicles that have stayed at the cluster 30 is above a threshold value, e.g. in the range 30-80.

Another option is to filter out clusters only comprising very few stops, as such areas may not be considered relevant parking areas. Thus, according to some embodiments, the pre-determined criteria comprise that the number of stops 20 of the clusters is above a threshold value, e.g. in the range 30-80.

For example, to avoid private parking areas one might require that e.g. 50 unique vehicles have stayed at a cluster during the last month. Such a rule would also exclude parking areas where very few vehicles have stopped.

The filtering may also remove clusters, where the time between the stops is very long. Thus, according to some embodiment the pre-determined criteria comprises that the frequency of points in time, at which one of the plurality of vehicles 100 has stayed at the cluster 30, is within a pre-determined interval, e.g. 40-60 days.

According to some embodiment the pre-determined criteria comprises other criteria defined by user input. For example, parking areas that other drivers marked as irrelevant e.g. as they are non-suitable, unsafe or inconvenient, may be filtered away. Different types of such user input will be further explained below.

As an example of a pre-determined criteria, one safe assumption that can be used to identify parking areas from clusters is e.g. to assume that a parking area is an area (i.e. a cluster) where more than X vehicles from Y different vehicle owners have stayed for more than Z minutes/hours. Additional heuristics can be developed as development progresses e.g. using machine learning and/or user input.

The clusters 30 may also be associated with other data that describes the cluster, e.g. a cluster may include a histogram of arrival times (e.g. 20% morning, 30% morning, 10% afternoon, 35% evening, 5% night) or a histogram of what times of the day connected vehicles are on site. For example, if a vehicle arrives in the evening and stands in the morning, it contributes to the "buckets" evening, night and morning. Other possible parameters that may be associated with a cluster are "The number of vehicles that stayed at the parking area last month", "The number of vehicles that have stayed at the parking area last month" or "Average time for parking in the parking area". All such data may be used by the predetermined criteria to decide if a cluster is a (suitable) parking area.

It may also be relevant to know whether the determined parking areas 40 are full or not. Since the position data (e.g. GPS data from a plurality of vehicles) shows where all the plurality of vehicles 100 are at the moment, and where they have been (and in which direction they are driving), this data may also be used to determine which vehicles are currently parked in a parking area and also to estimate which vehicles are on their way to a parking area or which vehicles are likely to leave soon. Alternatively, user input or input from other devices, such as cameras at the plurality of vehicles 100, may be used to predict the availability.

In other words, according to some embodiments, the method further comprises determining S5, based on the position data or user input, availability information associated with the determined parking areas 40. Stated differently, in some embodiments the method further comprises predicting, based on the position data and or user input, whether one of the determined parking areas 40 is full or not.

The determined parking areas 40 are typically exposed or provided through an Application Programming Interface, API. Stated differently, in some embodiments the method further comprises providing information identifying the determined parking areas through an API. The API may be an internal API (only accessible by the service provider e.g. a vehicle manufacturer) or it may be a publicly available API accessible by anyone. On top of the API, complete service functionality, e.g. a user interface, could be added.

Thus, in some embodiments the method further comprises providing S6 information identifying the determined parking areas to a user via a user interface 300. The user interface 300 may be generated in different ways and it may be presented using different means e.g. displays. The user interface 300 may e.g. be a web interface, a mobile device or other software application. The user interface 300 may be provided on displays of different types of devices, such as mobile phones, tablets or computers. One possibility is to mark parking areas, and their size, on a map in a graphical user interface so that drivers easily can check suitable places to take their breaks. Alternatively, the information may be provided by audio, in writing or using any other means.

Other information may also be provided, such as determined availability information, security information or information provided by other drivers.

A common challenge in all data mining or machine learning is having knowledge about what a model should look like for known cases, so called ground truth. One suggestion is that the drivers themselves can mark spots on a map, that might be reviewed before they get visible to everyone. The drivers may also be requested to mark areas where it's possible to stay overnight and to grade them and write short comments about them. In other words, in some embodiment, the method comprises receiving, via the user interface 300, user input comprising information associated with parking areas.

In another example, it may be possible to indicate to the users if a lot of incidents/crimes have been committed in a specific place. Such information could be fetched from filed police reports as a complement to the drivers' grades.

Figure 7:
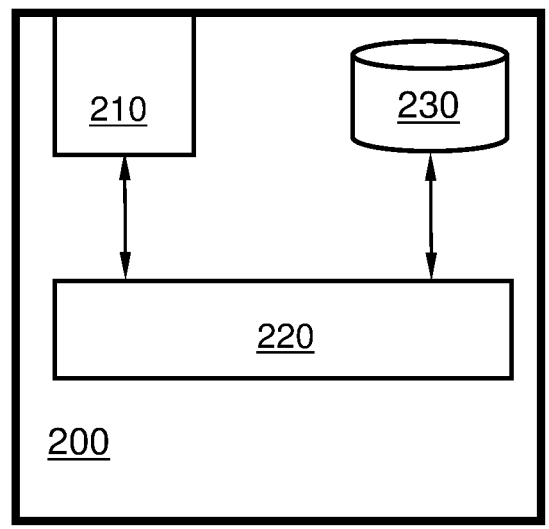
FIG. 7 illustrates a control arrangement according to an example embodiment.

FIG. 7 illustrates a control arrangement 200 according to an example embodiment. The control arrangement 1 is an off-board system also referred to as a backend, that is typically implemented in an external server, such as a server at the vehicle manufacturer or a cloud server.

In a typical implementation, the control arrangement 200 comprises a processor 210, a communication interface 220 and memory 230. The control arrangement 200 may further be connected to, or comprise, at least one display, where a user interface 300 may be generated.

The processor 210 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein used expression "processor" may thus represent a processing circuitry comprising a plurality of processing circuits, such as, e.g., any, some or all of the ones enumerated above.

The communication interface 220 is configured to enable communication between the control arrangement 200 and external devices. For example, the communication interface 220 is configured to enable communication between the plurality of vehicles 100 and the control arrangement 200. The communication interface 220 may be a standard wired or wireless communication interface. For example, the communication interface is configured to establish an Ethernet connection or a WiFi connection. The communication interface 220 may also be configured to enable communication with other devices, such as with a display where the user interface 300 is generated or with external databases comprising information used when determining the parking areas.

The control arrangement 200, or more specifically the processor 210 of the control arrangement, is configured to perform all aspects of the method described above and below. This is typically done by running computer program code stored in the memory 230 in the one or more processors 210 of the control circuitry.

The computer program product mentioned above may be provided for instance in the form of a data carrier carrying computer program code for performing at least some of the step S1-S6 (FIG. 5) according to some embodiments when being loaded into the processor 210 of the control arrangement 200. The data carrier may be, e.g., a hard disk, a CD ROM disc, a memory stick, an optical storage device, a magnetic storage device or any other appropriate medium such as a disk or tape that may hold machine readable data in a non-transitory manner.

More specifically, the control arrangement 200 is configured to obtain position data of a plurality of vehicles 100. This typically comprises receiving data from the plurality of vehicles 100 over an internet connection that is established using cellular networks.

The control arrangement 200 is further configured to determine stops 20, wherein one stop is a geographical position where one vehicle of the plurality of vehicles 100 has stayed longer than a pre-determined time period, as already explained in relation to FIG. 5.

The control arrangement 200 is further configured to cluster the determined stops 20 into clusters 30 based on geospatial closeness of the stops 20, and to determine parking areas 40 by identifying clusters 30 that fulfil one or more pre-determined criteria, as already explained in relation to FIG. 5.

In some embodiments the control arrangement 200 is configured to obtain position data of a plurality of vehicles 100 and to determine the stops 20 based on the position data. The position data is e.g. obtained from the plurality of vehicles 100 via the communication interface 220.

In some embodiments the position data comprises one stream of time stamped positions 10 for each of the plurality of vehicles 100 then the control arrangement 200 is configured to determine the stops 20 by identifying sequences of the time stamped positions 10 that have a spatial separation that is below a tolerance level.

In some embodiments each stop 20 is also associated with a time defining when a vehicle stayed at the stop 20 and then the clustering S3 is also based on time closeness of the times.

In some embodiments the control arrangement 200 is configured to determine more than a pre-determined number of stops 20.

In some embodiments the control arrangement 200 is configured to determine, based on position data and/or user input, availability information associated with the determined parking areas 40.

In some embodiments the control arrangement 200 is configured to expose the determined parking areas through an Application Programming Interface, API. The API may be ab external API that is accessible over the communication interface 220.

In some embodiments the control arrangement 200 is configured to provide information identifying the determined parking areas to a user via a user interface 300. The user interface 300 may be provided at a display comprised in the control arrangement 200. Alternatively, it may be provided at a display, e.g. a display of a mobile phone or a computer, connected to the control arrangement 200 via the communication interface 220.

Figure 8A:
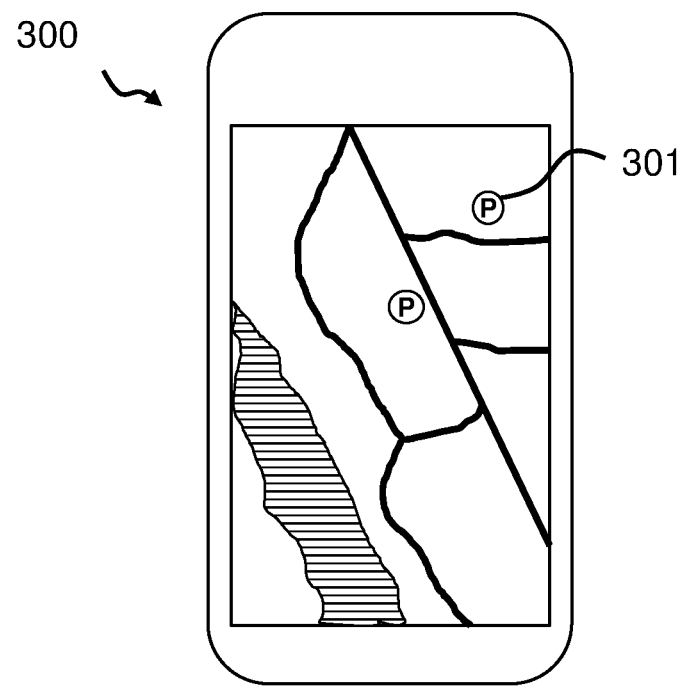
FIGS. 8a and 8b illustrates an example implementation of a user interface.

FIG. 8a illustrates an example implementation of a user interface 300 (rendered on a mobile phone 80) for providing information identifying the determined parking areas to a user. As illustrated in FIG. 8a, the parking areas may be indicated on a map, as selectable icons 301, e.g. in a navigation application.

Figure 8B:
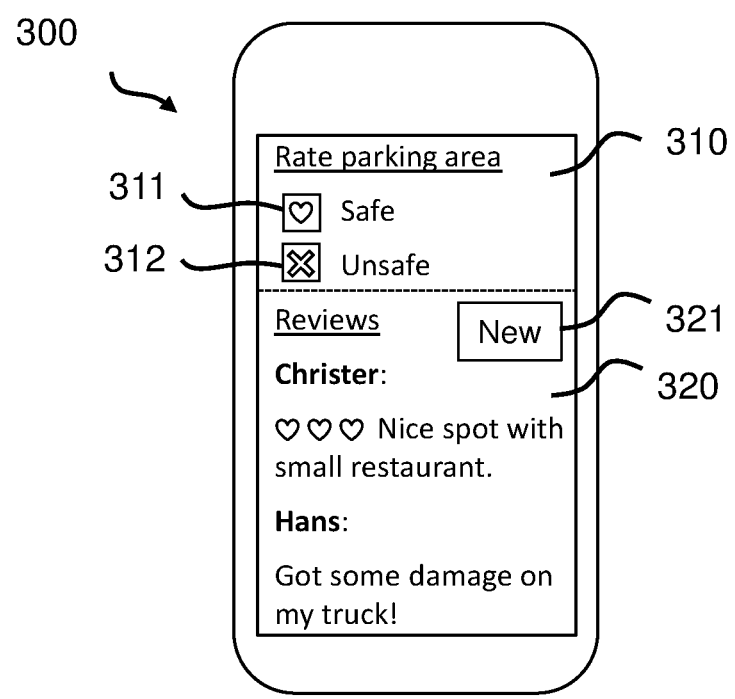

FIG. 8b illustrates an example implementation of a user interface 300 for receiving user input associated with the determined parking areas. This user interface may e.g. be generated when a user clicks on one of the selectable icons 301 shown in FIG. 8a. The user interface may e.g. comprise one section 310 for rating or grading parking areas, by selecting one of a plurality of selectable the icons "Safe" 311 or "Unsafe" 312. The user interface may also comprise one section 320 where a user may read or provide comments about a parking area. A new comment may e.g. be registered by selecting the icon "New" 321.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium sup-plied together with or as part of other hardware but may also be distributed in other forms such as via Internet or other wired or wireless communication system.

The invention claimed is:

1. A method for identifying parking areas, the method comprising:
   obtaining position data of a plurality of vehicles;
   determining stops of a plurality of vehicles based on the position data, wherein one stop is a geographical position where one vehicle of the plurality of vehicles has stayed longer than a pre-determined time period;
   clustering the determined stops into clusters based on spatial closeness of the geographical positions of the determined stops; and
   determining parking areas by identifying one or more of the clusters that fulfil one or more pre-determined criteria.

2. The method according to claim 1, wherein the position data comprises one stream of time stamped positions for each of the plurality of vehicles and wherein the determining comprises identifying sequences of the time stamped positions that have a spatial separation that is below a tolerance level.

3. The method according to claim 1, wherein each stop is also associated with a time defining when a vehicle stayed at the stop, and wherein the clustering is further based on time closeness of the times defining when each vehicle stayed at the stop.

4. The method according to claim 1, wherein the determining stops of a plurality of vehicles comprises determining more than a pre-determined number of stops.

5. The method according to claim 1, wherein the method further comprises:
   providing information identifying the determined parking areas to a user via a user interface.

6. The method according to claim 1, wherein the pre-determined criteria comprises at least one of:
   that the number of stops of the cluster is above a threshold value,
   that the vehicles that have stayed at the cluster belong to more than a pre-determined number of vehicle owners,
   that the number of different individual vehicles that have stayed at the cluster is above a threshold value,
   that the frequency of points in time, at which one of the plurality of vehicles has stayed at the cluster, is within a pre-determined frequency interval, and/or
   criteria defined by user input.

7. A control arrangement configured to identify parking areas, the control arrangement being configured to:
   obtaining position data of a plurality of vehicles;
   determine stops of a plurality of vehicles based on the position data, wherein one stop is a geographical position where one vehicle of the plurality of vehicles has stayed longer than a pre-determined time period;
   cluster the determined stops into clusters based on geo-spatial closeness of the geographical positions of the stops; and
   determine parking areas by identifying one or more of the clusters that fulfil one or more pre-determined criteria.

8. The control arrangement according to claim 7, wherein the position data comprises one stream of time stamped positions for each of the plurality of vehicles and wherein the control arrangement is configured to determine the stops by identifying sequences of the time stamped positions that have a spatial separation that is below a tolerance level.

9. The control arrangement according to claim 7, wherein each stop is also associated with a time defining when a vehicle stayed at the stop, and wherein the clustering is further based on time closeness of the times defining when each vehicle stayed at the stop.

10. The control arrangement according to claim 7, wherein the control arrangement is configured to determine more than a pre-determined number of stops.

11. The control arrangement according to claim 7, wherein the control arrangement is configured to:
   provide information identifying the determined parking areas to a user via a user interface.

* * * * *